United States Patent
Kang et al.

(10) Patent No.: US 10,136,122 B2
(45) Date of Patent: Nov. 20, 2018

(54) AUTOSTEREOSCOPIC 3-DIMENSIONAL DISPLAY

(71) Applicant: LG Display Co., Ltd., Seoul (KR)

(72) Inventors: Hoon Kang, Goyang-si (KR); Heejin Im, Paju-si (KR); Ara Yoon, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/638,915

(22) Filed: Jun. 30, 2017

(65) Prior Publication Data

US 2018/0007348 A1    Jan. 4, 2018

(30) Foreign Application Priority Data

Jun. 30, 2016  (KR) .................. 10-2016-0083088

(51) Int. Cl.
| | |
|---|---|
| *H04N 13/315* | (2018.01) |
| *H04N 13/305* | (2018.01) |
| *G02B 27/22* | (2018.01) |
| *H04N 13/31* | (2018.01) |
| *H04N 13/128* | (2018.01) |
| *H04N 13/111* | (2018.01) |
| *H04N 13/00* | (2018.01) |

(52) U.S. Cl.
CPC ....... *H04N 13/305* (2018.05); *G02B 27/2214* (2013.01); *H04N 13/111* (2018.05); *H04N 13/128* (2018.05); *H04N 13/31* (2018.05); *H04N 13/315* (2018.05); *H04N 2013/0081* (2013.01)

(58) Field of Classification Search
CPC . G02F 1/1343–1/134309; G02B 27/22–27/26; H04N 13/0404
See application file for complete search history.

(56) References Cited

U.S. PATENT DOCUMENTS

| | | | |
|---|---|---|---|
| 8,665,383 B2 | 3/2014 | Lee et al. | |
| 8,854,436 B2 | 10/2014 | An et al. | |
| 2009/0002267 A1* | 1/2009 | Nam ................. | G02B 27/2214 345/6 |

(Continued)

FOREIGN PATENT DOCUMENTS

| | | |
|---|---|---|
| KR | 20110111128 A | 10/2011 |
| KR | 20120069135 A | 6/2012 |

*Primary Examiner* — Mariceli Santiago
(74) *Attorney, Agent, or Firm* — Polsinelli PC

(57) ABSTRACT

The present disclosure relates to an autostereoscopic three-dimensional (or, 3D) display using a switchable barrier. The present disclosure provides an autostereoscopic 3D display comprising: a display panel including a plurality of pixels arrayed in a matrix manner; and a switchable barrier disposed on a front surface of the display panel, wherein the switchable barrier includes: a lower substrate having first lower electrodes, a first passivation layer covering the first lower electrodes, second lower electrodes on the first passivation layer, a second passivation layer covering the second lower electrodes, and third lower electrodes on the second passivation layer; an upper substrate having an upper electrode facing with the first lower electrodes, the second lower electrodes and the third lower electrodes; and a liquid crystal layer disposed between the lower substrate and the upper substrate.

14 Claims, 6 Drawing Sheets

(56) References Cited

U.S. PATENT DOCUMENTS

| | | | |
|---|---|---|---|
| 2009/0224646 A1* | 9/2009 | Kim | G02B 27/2214 |
| | | | 313/245 |
| 2012/0236043 A1* | 9/2012 | Jung | G02B 27/2214 |
| | | | 345/690 |
| 2013/0135545 A1* | 5/2013 | Jung | G02F 1/13306 |
| | | | 349/33 |
| 2014/0125783 A1* | 5/2014 | Chung | G09G 3/3614 |
| | | | 348/51 |
| 2014/0198099 A1* | 7/2014 | Tseng | G02B 27/2214 |
| | | | 345/419 |
| 2015/0109269 A1* | 4/2015 | Sung | G09G 3/003 |
| | | | 345/206 |

* cited by examiner

AUTOSTEREOSCOPIC 3-DIMENSIONAL DISPLAY

CROSS REFERENCE TO RELATED APPLICATION

This application claims the benefit of Korea Patent Application No. 10-2016-0083088 filed on Jun. 30, 2016, which is incorporated herein by reference in its entirety for all purposes as if fully set forth herein.

BACKGROUND

Field of the Disclosure

The present disclosure relates to a display device, and more particularly, to an autostereoscopic three-dimensional (or, 3D) display using a switchable barrier.

Description of the Background

Due to the development of the stereoscopic image display technologies, a stereoscopic image reproducing technique is applied to a display device such as a television or a monitor, so that anyone can appreciate a stereoscopic image anywhere. A stereoscopic image display may be defined as a system for artificially reproducing a 3D image.

The reason why a person feels visually stereoscopic is because of binocular disparity, which is caused by the fact that the eyes are separated 65 mm apart in the horizontal direction. When a person's eyes observe a thing, because of binocular parallax, each of two eyes see different images, respectively, viewed from slightly different angles. As these two images are sent to the brain through the retina, the brain can recognize the stereoscopic image by precisely combining these two images.

The autostereoscopic 3D display generates a virtual stereoscopic effect through a design that displays both the left eye image and the right eye image in the two-dimensional display according to the mechanism of the binocular disparity, and sends them to the left eye and the right eye, respectively. As the methods for realizing binocular parallax, a spectacle type (or, glasses type) display and a non-spectacle type (or, non-glasses type) display have been developed.

The spectacle type display is divided into a time division system and a space division system. In the time division system, the left eye image and the right eye image are sequentially displayed with a time lag, and the shutter glasses or the polarizing glasses are used to provide a stereoscopic image. In the space division system, the left eye image and the right eye image are displayed at the same time, but each of them are provided with the different polarized light, respectively. The stereoscopic images are provided using the polarized glasses or the shutter glasses.

In the non-spectacle type display (or, 'autostereoscopic 3D display'), the left eye image and the right eye image are displayed at the same time, and the optical axes of these two images are separated from each other. These images are provided to the left eye and the right eye, respectively. The non-spectacle type display may be divided into the parallax barrier system, the lenticular lens system and the integral photography system. In the parallax barrier system, a vertical grid-like aperture is disposed on the front of the display to separate the left eye image and the right eye image. In the lenticular lens system, a lens film in which a plurality of the semi-cylindrical lens is continuously arrayed is attached to a front surface of the display to provide the left eye image and the right eye image. The integral photography system uses a dragonfly-eye-shaped lens plate to separate the left eye image and the right eye image.

Recently, the 3D cells having a parallax barrier or a lenticular lens using a liquid crystal cell have been developed. The parallax barrier or the lenticular lens according to the related art is a fixed optical lens film type in which it is hard to enjoy the normal stereoscopic images when the observer are moving or the display is changed its position. On the contrary, for the liquid crystal 3D cell, by electrically controlling the liquid crystal layers, the switchable barrier or the switchable lens is represented replacing the parallax barrier or the lenticular lens. Further, if required, the switchable barrier or the switchable lens may be shifted to the left side or the right side so that observer can enjoy the stereoscopic images always normally even if he/she is moving.

FIG. 1 is a schematic diagram illustrating the autostereoscopic 3D display according to the related art. Referring to FIG. 1, the autostereoscopic 3D display includes a display panel 100, a display panel driver 130, a 3D cell driver 210, a timing controller 101 and so on.

The display panel 100 may be a flat panel display such as a liquid crystal display (or, 'LCD'), a field emission display (or, 'FED'), a plasma display panel (or, 'PDP'), an organic light emitting diode display (or, OLED) and so on. The display panel 100 may include a plurality of the data lines 105 and a plurality of the gate line (or, scan lines) 106, which are crossing each other. At each of the rectangular areas defined the crossing structure of the data lines 105 and the gate lines 106, a pixel PXL is placed, respectively. Each pixel may include a plurality of sub pixels, each sub pixel having a unique color. The display panel 100 represents 2D images at the 2D mode, and the left eye image and the right eye image at the 3D mode.

The display panel driver 130 includes a data driving circuit 102 and a gate driving circuit 103. The data driving circuit 102 supplies the 2D image data voltages or the 3D image data voltages to the data lines 105. The gate driving circuit 103 sequentially supplies the gate pulse (or, scan pulse) to the gate lines 106. In the 3D mode, the display panel driver 130 may supply the left eye image data and the right eye image data to the pixels of the display panel 100 by separating them using the space divisional method.

The data driving circuit 102 converts the digital video data received from the timing controller 101 into the analog gamma voltage to generate the data voltages, and then supply the data voltages to the data line 105. The gate driving circuit 103 supplies the gate pulse to the gate lines 106 by the timing controller 101, wherein the gate pulse is the signal for synchronizing with the data voltages for supplying the data voltage to the data lines 105. The gate pulse is sequentially supplied to the gate lines 106.

The timing controller 101 supplies the digital video data RGB of the 2D/3D input images from the host system 110 to the data driving circuit 102. With the digital video data RGB, the timing controller 101 receives the timing signals from the host system 110 such as the vertical synchronizing signal, the horizontal synchronizing signal, the data enable signal, and the main clock. Using the timing signal received from the host system 110, the timing controller 101 controls the each operating timings of the display panel driver 130 and the 3D cell driver 210, and generates the timing control signals DDC, GDC and 3DC for synchronizing the operating timing of the drivers.

A 3D data formatter 120 is disposed between the host system 110 and the timing controller 101. At the 3D mode, the 3D data formatter 120 rearranges the left eye image and the right eye image of the 3D image received from the host system 110 into the predetermined data format, and transmits the left eye image and the right eye image to the timing controller 101.

The host system 110 is one of the television set, the set-top box, the navigation system, the DVD player, the blue-ray player, the personal computer, the home theater system or the smart phone system. Using a scaler, the host system 110 converts the digital video data of the 2D/3D input image into a format proper to the resolution of the display panel 100, and then transmits the converted format of the video data with the timing signals to the timing controller 101.

The host system 110 supplies 2D image to the timing controller 101 at 2D mode, and 3D image or 2D image data to the 3D data formatter 120 at 3D mode. Responding to the user's data via the user interface 112, the host system 110 sends all signals to the timing controller 101 to select the operating mode of the non-spectacular stereoscopic display into the 2D mode or the 3D mode. The user interface 112 is one of the key pad, the keyboard, the mouse, the on-screen display (or 'OSD'), the remote controller, the graphic user interface, the touch user interface, the voice recognizing user interface, the 3D user interface and so on.

The 3D cell 200 includes a parallax barrier. The 3D cell 200 is disposed in front of or behind of the display panel 100 or embedded into the display panel 100 so that it can divide the lights of the left image and the right image of the 3D images. The 3D cell driver 210 conducts the driving operation synchronized with the data supplied to the pixels of the display panel 100, by the timing controller 101.

For the parallax barrier type autostereoscopic 3D display, the parallax barrier film is attached on the display panel 100. The film having a fixed parallax barrier pattern is attached on the surface of the display panel 100. Therefore, in order that the observer enjoys the stereoscopic images normally, he/she should be located at the optimized position. For example, when the observer is located at the optimal distance, if not located within an optimal angle range, he/she cannot enjoy the normal stereoscopic images. In addition, as the size and the pitch of the parallax barrier pattern are fixed, the uniquely designed parallax barrier pattern is required for the display panel 100 according to the size of the pixel and resolution of the display panel 100.

SUMMARY

In order to overcome the above mentioned drawbacks, the purpose of the present disclosure is to provide an autostereoscopic 3D display having a switchable barrier using a liquid crystal panel. Another purpose of the present disclosure is to provide an autostereoscopic 3D display having a switchable barrier in which the aperture areas are defined by not being affected by the structure of the display panel. Still another purposed of the present disclosure is to provide an autostereoscopic 3D display having the superior stereoscopic images in which the number of the electrodes for representing the switchable barrier is increased by stacking three layers of the electrodes and preventing the electric short between the electrodes.

In order to accomplish the above purpose, the present disclosure provides an autostereoscopic 3D display comprising: a display panel including a plurality of pixels arrayed in a matrix manner; and a switchable barrier disposed on a front surface of the display panel, wherein the switchable barrier includes: a lower substrate having first lower electrodes, a first passivation layer covering the first lower electrodes, second lower electrodes on the first passivation layer, a second passivation layer covering the second lower electrodes, and third lower electrodes on the second passivation layer; an upper substrate having an upper electrode facing with the first lower electrodes, the second lower electrodes and the third lower electrodes; and a liquid crystal layer disposed between the lower substrate and the upper substrate.

In one aspect, the first lower electrodes have a predetermined width and are disposed with a predetermined distance twice of the width, the second lower electrodes have the width and are disposed with the distance, and each of the second lower electrode is disposed between two first lower electrodes, and the third lower electrodes have the width and are disposed with the distance, and each of the third lower electrode is disposed between the first lower electrode and the second lower electrode.

In one aspect, an autostereoscopic 3D display device includes first and second substrates facing each other; a plurality of first lower electrodes on the first substrate; a first passivation layer on the first substrate including the first lower electrodes; a plurality of second lower electrodes on the first passivation layer; a second passivation layer on the first passivation layer including the second lower electrodes; an upper electrode on the second substrate and facing the first, second; and a liquid crystal layer between the first and second substrates.

In one aspect, the first lower electrodes, the second lower electrodes and the third lower electrodes define channels distinguished each other, and an aperture area and a barrier area are defined by electric voltages applied to the channels.

In one aspect, the first lower electrodes, the second lower electrodes and the third lower electrodes have a predetermined width and are disposed with a predetermined distance corresponding to the width, and any two of the first, second and third lower electrodes are not overlapped each other, and the other lower electrode is overlapped with halves of the two lower electrodes overlapped each other.

In one aspect, channels are defined at each half portion of two lower electrodes overlapped each other, and an aperture area and a barrier area are defined by a final voltages of the channels decided by the combination of electric voltages supplied to the first lower electrodes, the second lower electrodes and the third lower electrodes, respectively.

In one aspect, the first lower electrodes having the width are disposed with the distance corresponding to the width, each of the second lower electrodes are disposed between two neighboring first lower electrode, and each of the third lower electrodes overlaps with a half portion of the first lower electrode and a half portion of the second lower electrode.

The present disclosure provides a switchable barrier using a liquid crystal panel in which the aperture area may be actively shifter or moved according to the changes of the observer's position. Regardless of the positions of the observer, the observer can always enjoy the normal stereoscopic images from the autostereoscopic 3D display according to the present disclosure. Configuring multiple (three or more) layered electrodes, the switchable barrier according to the present disclosure have no electric short problem due to the pattern defects. Configuring multiple layered electrodes, the switchable barrier according to the present disclosure can form more channels within the same one barrier pitch even though the width of the electrodes is not patterned more precisely. As the results, the freedom degree of the switchable barrier can be increased. The autostereoscopic 3D display can provide superior quality of stereoscopic images regardless of the observer's movement.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure.

In the drawings.

DETAILED DESCRIPTION

Figure 1:
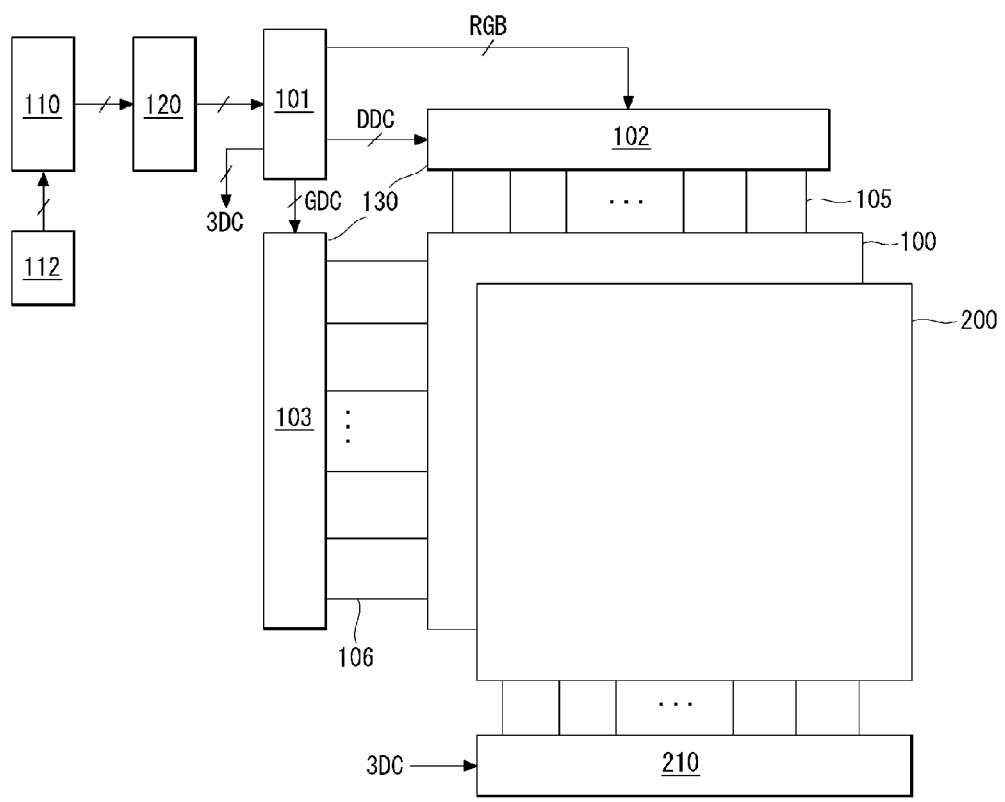
FIG. 1 is a schematic diagram illustrating an autostereoscopic 3D display according to the related art.

Referring to attached figures, we will explain preferred aspects of the present disclosure. Like reference numerals designate like elements throughout the detailed description. However, the present disclosure is not restricted by these aspects but can be applied to various changes or modifications without changing the technical spirit. In the following aspects, the names of the elements are selected by considering the easiness for explanation so that they may be different from actual names.

In order to solve the problems of the parallax barrier type autostereoscopic 3D display according to the related art, a parallax barrier cell BC in which the liquid crystal panel is electrically controlled has been provided. Applicant has provided the switchable barrier types or the switchable lens types such as U.S. patent application Ser. No. 13/077,565, U.S. patent application Ser. No. 13/325,272, Korean Patent Application No. 10-2010-0030531, and Korean Application No. 10-2010-0130547.

Figure 2:
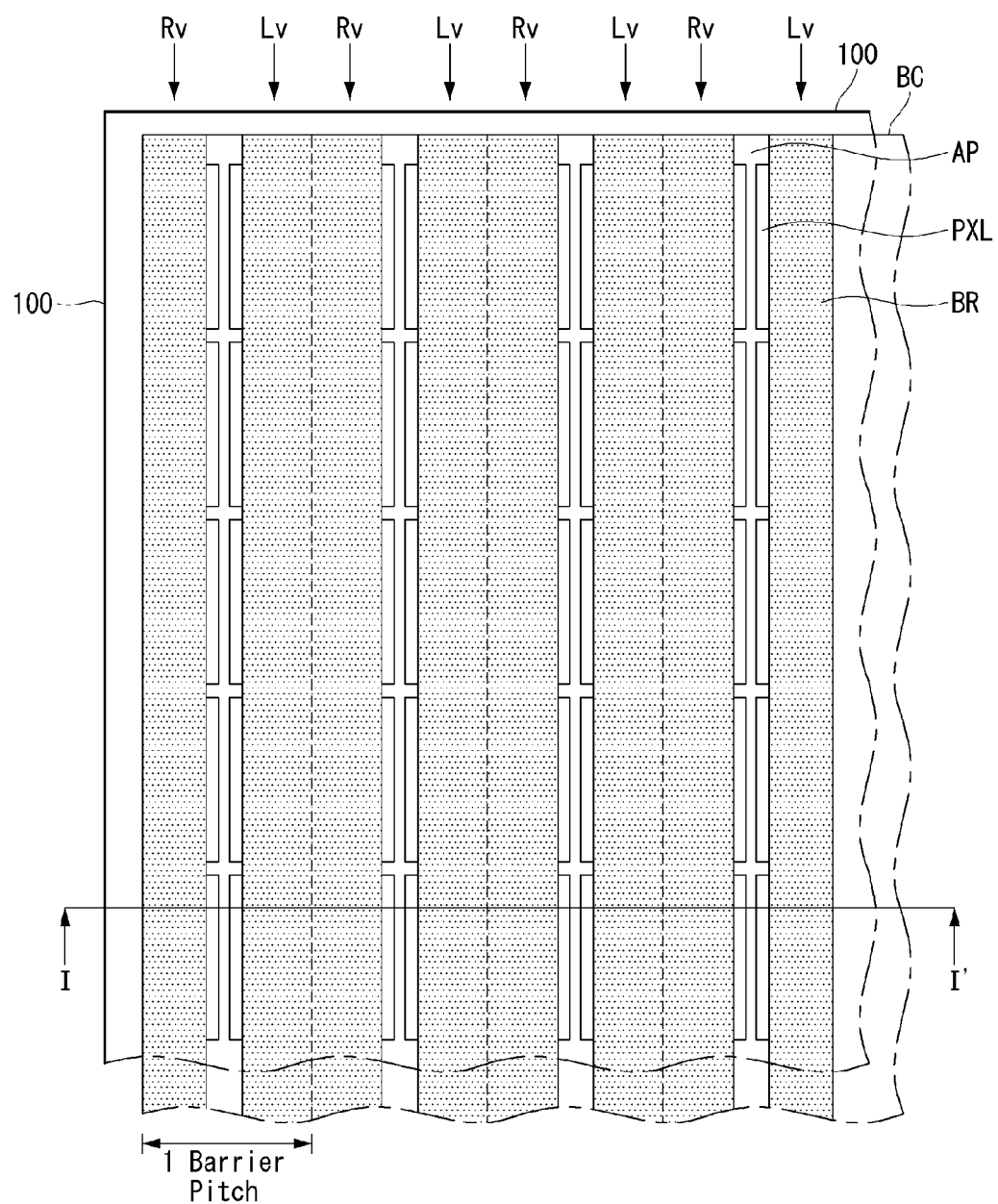
FIG. 2 is a plane view illustrating a structure of barriers in a switchable barrier type autostereoscopic 3D display according to the present disclosure.
Figure 3:
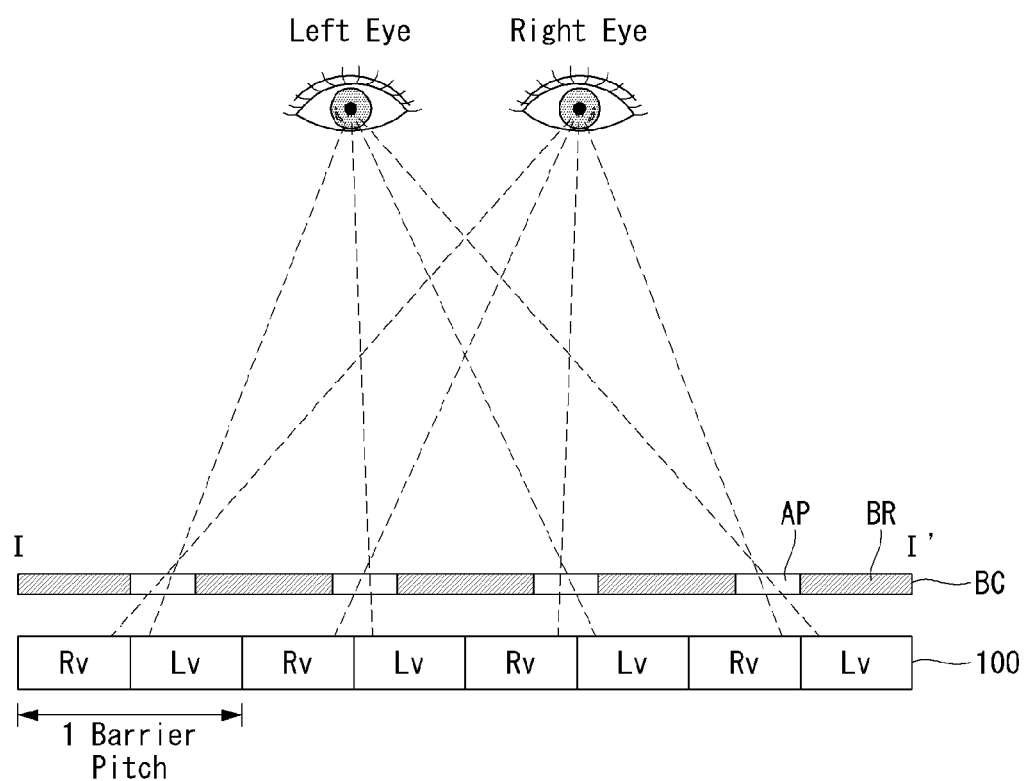
FIG. 3 is a cross-sectional view, along to line I-I' in FIG. 1, illustrating of a structure and an operation of a switchable barrier type autostereoscopic 3D display according to the present disclosure.

Hereinafter, referring to FIGS. 2 and 3, the structure and the operating method of the switchable barrier type autostereoscopic 3D display according to the present disclosure will be explained in detail. FIG. 2 is a plane view illustrating a structure of the barriers in a switchable barrier type autostereoscopic 3D display according to the present disclosure. FIG. 3 is a cross-sectional view, along line I-I' in FIG. 2, illustrating of a structure and an operation of a switchable barrier type autostereoscopic 3D display according to the present disclosure. For convenience, descriptions will be focused on the display panel and the switchable barrier cell.

The switchable barrier type autostereoscopic 3D display according to the present disclosure includes a display panel 100 and a switchable barrier cell BC disposed on the front surface of the display panel 100. In the switchable barrier type autostereoscopic 3D display, the switchable barrier cell BC is corresponding to the 3D cell in FIG. 1.

The display panel 100 includes a plurality of the pixels P×L arrayed in a matrix manner. The pixels PXL includes a plurality of the right-eye image pixel columns Rv and the left-eye image pixel columns Lv alternatively arrayed. The switchable barrier cell BC includes a plurality of barriers and a plurality of aperture areas. One aperture area AP of the switchable barrier cell BC is disposed at the boundary between the right-eye image pixel columns Rv and the left-eye image pixel columns Lv. As exposing some of the right-eye image pixel columns Rv and the left-eye image pixel columns Lv, the aperture area AP has a slit shape. In FIG. 2, according to the switchable barrier cell BC of the present disclosure, the barrier area BR and the aperture area AP are not disposed at fixed positions. The switchable barrier of the present disclosure may be configured using a liquid crystal cell. As the liquid crystal is driven by the electric voltages supplied to the liquid crystal cells, the barrier area BR and the aperture area AP can be actively formed.

Neighboring two barrier areas BR and one aperture area AP disposed between two barrier areas BR forms one barrier pitch. Within one barrier pitch, at least two pixels are disposed in a lateral direction. In that case, one barrier pitch includes two pixels to divide the images into the left-eye image and the right-eye image. However, for the case that the images are divided into three images, the three pixels may be disposed within one barrier pitch.

Referring to FIG. 3, by the aperture area AP of the switchable barrier cell BC disposed on the display panel 100, the optical axis of the right-eye image and the optical axis of the left-eye image are divided each other. As the observer locates to the optimal position, the right eye of the observer sees the right-eye image only and the left eye of the observer sees the left-eye image only. Therefore, the observer can enjoy the stereoscopic images.

In the various aspects hereinafter, we will explain the various structures of the electrodes for representing/forming the aperture areas AP and the barriers BR, for the switchable barrier cell BC according to the present disclosure.

First Example

Figure 4:
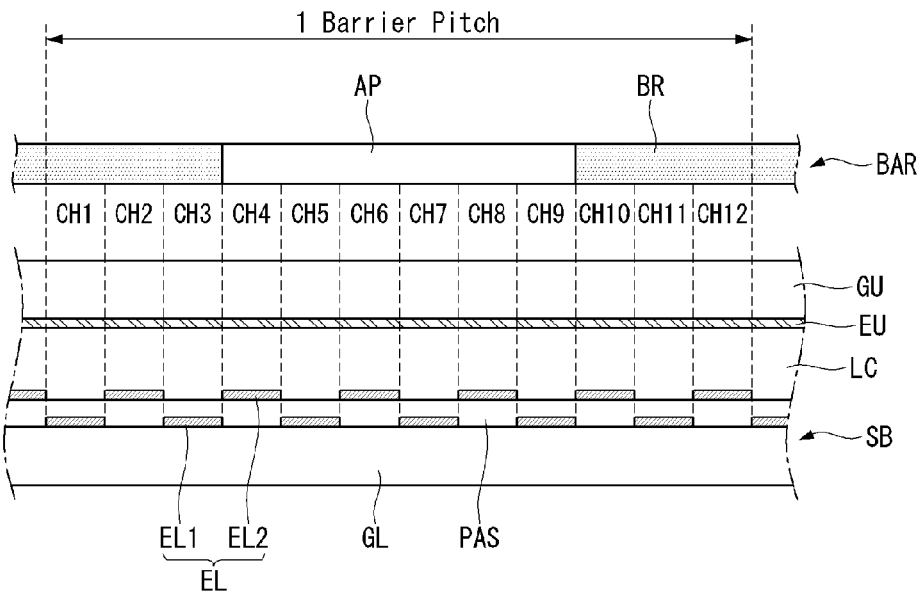
FIG. 4 is a cross sectional view illustrating a structure of a switchable barrier according to the first aspect of the present disclosure.

FIG. 4 is a cross-sectional view illustrating a structure of a switchable barrier (or moving barrier) according to an aspect of the present disclosure. For convenience, it does not show the whole structure of the autostereoscopic 3D display according to the present disclosure but illustrates the main element such as a structure of the switchable barrier. FIG. 4 illustrates the switchable barrier represented by the liquid crystal panel instead of the parallax barrier cell BC of the FIG. 3. The barrier BAR disposed on the upper portion of the switchable barrier SB is not actually included in the switchable barrier SB, but the imaginary element illustrating the aperture area AP and the barrier area BR represented by the switchable barrier SB.

The switchable barrier SB according to the first aspect of the present disclosure includes a transparent lower substrate GL and a transparent upper substrate GU joined in surface each other, and a liquid crystal layer LC inserted between them. The lower substrate GL includes a plurality of lower electrodes EL. The upper substrate GU includes an upper electrode EU. The upper electrode EU may have a one sheet shape covering the whole surface of the upper substrate GU, and can be supplied with the same reference voltage.

The lower electrodes EL are arrayed with a predetermined distance. In detail, the lower electrodes EL are disposed in a double layer structure. For example, on the lower substrate GL, a plurality of first lower electrodes EL1 is arrayed with a first predetermined distance. The first lower electrodes EL1 are covered by a passivation layer PAS. On the passivation layer PAS, a plurality of second lower electrode EL2 is arrayed with a second predetermined distance. The first lower electrodes EL1 and the second lower electrodes EL2 are disposed with a predetermined distance as not vertically overlapping each other.

For example, each of the first lower electrodes EL1 have a width of 8 μm and they are arrayed with 8 μm distance (or gap). Further, on the first passivation layer PAS1, each of the second lower electrodes EL2 have a width of 8 μm and they are arrayed with 8 μm distance.

Each of the first lower electrode EL1 and the second lower electrode EL2 is supplied with an electric voltage, respectively. Then by the voltage differences between the lower electrodes EL and the upper electrode EU, the molecules of the liquid crystal layer LC may be rotated or changed their positions. As the conditions of the liquid crystal molecules are changed, the aperture area AP and the barrier area BR can be formed.

For example, as shown in FIG. 4, when 12 of lower electrodes EL are disposed within one barrier pitch, one channel CH is formed at each lower electrode EL. That is, 12 of channels CH1 to CH12 are continuously disposed within one barrier pitch.

Under this structure, an electric voltage of 0V is applied to the first channel CH1, the second channel CH2, the third channel CH3, the tenth channel CH10, the eleventh channel CH11 and the twelfth channel CH12. Further, the electric voltage of 10V is applied to from the fourth channel CH4 to the ninth channel CH9, so that the aperture area AP and the barrier area BR can be formed. That is, the area from the fourth channel CH4 to the ninth channel CH9 is defined as the aperture area AP of the switchable barrier SB.

In the first aspect of the present disclosure, by supplying different electric voltages to the first lower electrodes EL1 and the second lower electrodes EL2, the electric voltages for driving the liquid crystal layer LC may be supplied at each channel, as shown in Table 1. In Table 1, the electric voltages are supplied to the lower electrodes EL. The upper electrode EU is supplied with a common electric voltage (e.g., 0V).

TABLE 1

| Channel (CH) | EL1 voltage (V) | EL2 voltage (V) | Channel Voltage (V) |
| --- | --- | --- | --- |
| CH1 | 0 | — | 0 |
| CH2 | — | 0 | 0 |
| CH3 | 0 | — | 0 |
| CH4 | — | 10 | 10 |
| CH5 | 10 | — | 10 |
| CH6 | — | 10 | 10 |
| CH7 | 10 | — | 10 |
| CH8 | — | 10 | 10 |
| CH9 | 10 | — | 10 |
| CH10 | — | 0 | 0 |
| CH11 | 0 | — | 0 |
| CH12 | — | 0 | 0 |

In the Table 1, '-' means that there is no corresponding lower electrode. For example, the first channel CH1 has only the first lower electrode ELL and the second channel CH2 has only the second lower electrode EL2. By applying 0V at each of the first lower electrode EL1 and the second lower electrode EL2 allocated from the first channel CH1 to the third channel CH3, the voltages from the first channel CH1 to the third channel CH3 are set to 0V. Similarly, the voltages from the tenth channel CH10 to the twelfth channel CH12 can be set to 0V. In addition, by applying 10V at each of the first lower electrode EL1 and the second lower electrode EL2 allocated from the fourth channel CH4 to the ninth channel CH9, the voltages from the fourth channel CH4 to the ninth channel CH9 can be set to 10V. Then, the channels having the 0V may form the barrier area BR and the channels having the 10V may form the aperture area AP.

When it is required that the aperture area AP be moved to other location, the channels applied with 10V can be changed by controlling the voltages supplied to the lower electrodes EL1 and EL2. Then, the aperture area AP can be moved to other position. That is, the aperture area AP shown in FIG. 4 can be shifted or moved to the left side or the right side.

As described above, in the first aspect of the present disclosure, the switchable barrier SB has 12 channels in one barrier pitch. The switchable barrier SB according to the first aspect of the present disclosure has a plurality of the lower electrodes EL arrayed with a predetermined distance in series. By changing the distribution of the channels defined by the lower electrode EL, the size of the barrier pitch may be freely controlled. For example, when the width of the lower electrode EL is 8 μm, one barrier pitch would be 8(μm)×12(CH)=96 μm. For another example, as allocating 10 channels to one barrier pitch, one barrier pitch would be 80 μm. Like this manner, the switchable barrier SB may be controlled according to the pixel size and the gap of the pixels disposed at the display panel under the switchable barrier SB. Also, the aperture area AP may be freely changed.

The structure of the switchable barrier according to the first aspect of the present disclosure does not depend on the display panel. The size of the barrier pitch and the size of the aperture area can be changed according to the structure display panel. Further, the position of the aperture area can be freely changed. When the observer's location is changed in lateral direction, by detecting this movement, the position of the aperture area is changed so that the observer can always enjoy the normal stereoscopic images.

In the first aspect, the switchable barrier having 12 channels in one barrier pitch is exemplified. To enhance the freedom for changing the size of the barrier pitch, the size of the aperture area and the position of the aperture area of the switchable barrier according to the first aspect, the number of the channel can be increased.

Figure 5:
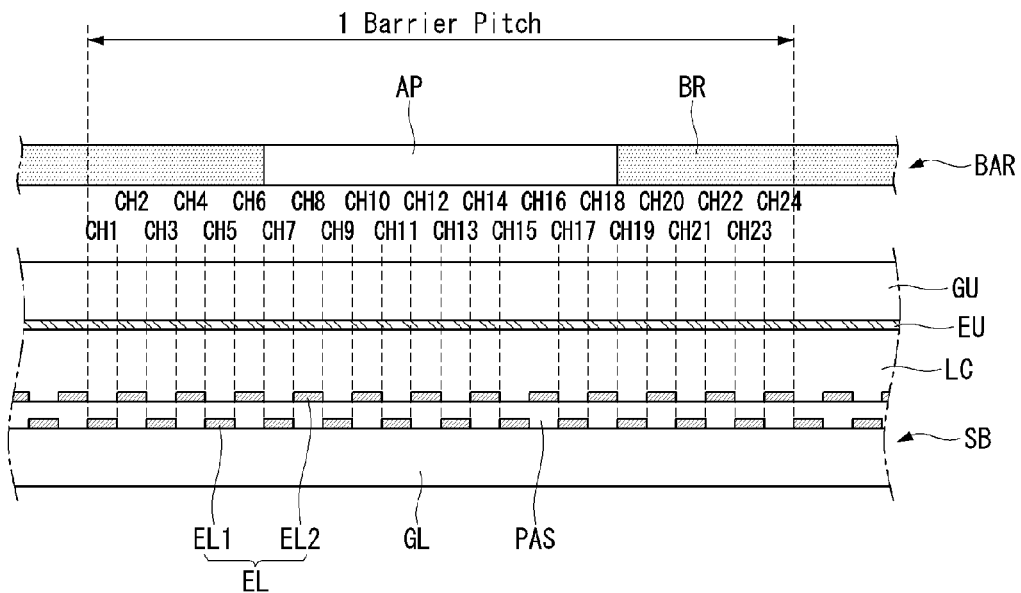
FIG. 5 is a cross-sectional view illustrating a structure of a switchable barrier in which more number of channels is formed by reducing the size of the electrodes in an aspect of the present disclosure.

FIG. 5 is a cross-sectional view illustrating a structure of a switchable barrier in which more number of channels is formed by reducing the size of the electrodes in the first aspect of the present disclosure. As shown in FIG. 5, by reducing the size of the lower electrode EL to 4 µm, the number of channel can be increased up to 24. As a result, the barrier pitch can be changed more precisely, and the size and the position of the aperture area can be controlled more precisely.

However, when forming the lower electrodes EL with highly precise pattern such as 4 µm, due to the residuals or the foreign materials, neighboring two lower electrodes disposed on the same layer may be contacted each other. For example, two neighboring first lower electrodes EL1 can be electrically shorted. Further, the electrical insulation between the neighboring first lower electrode EL1 and the second lower electrode EL2 can be broken. As a result, some channels can not be divided so that the channel can not be exactly formed.

With the structure of the first aspect, it is restricted to make the switchable barrier have a higher degree of freedom by reducing the size of the lower electrode for forming the channel. Therefore, a new structure is required for forming the switchable barrier having a higher degree of freedom for defining the switchable barrier, for controlling the aperture area more precisely and for enhancing the insulating property between electrodes for forming the channels.

Second Example

Figure 6:
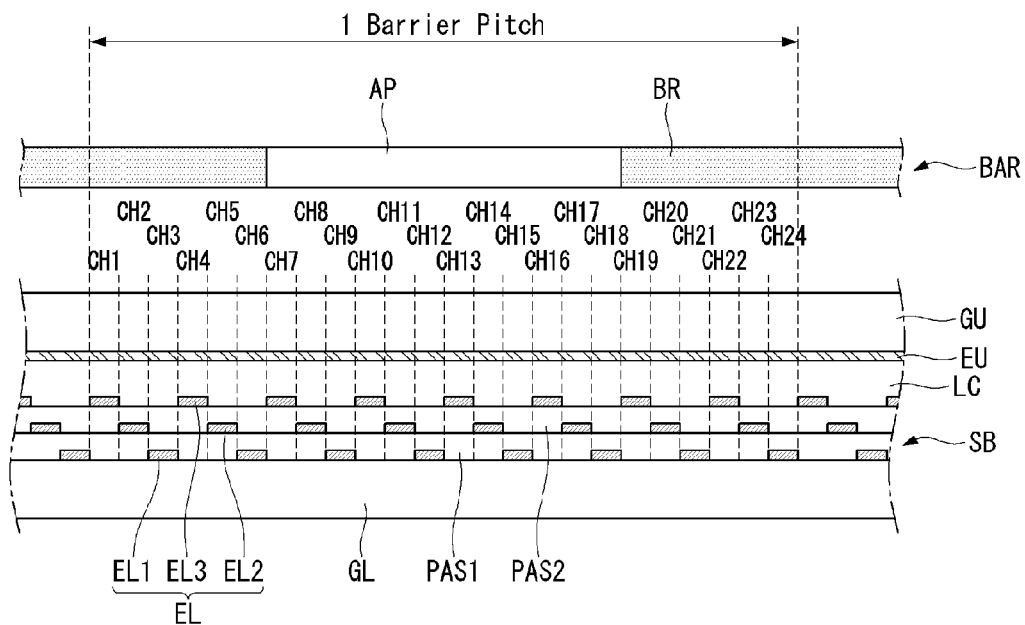
FIG. 6 is a cross-sectional view illustrating a structure of a switchable barrier according to another aspect of the present disclosure.

Another aspect of the present disclosure provides a switchable barrier having a structure in which there is no insulating breakage between neighboring two electrodes forming the channel when the number of the channel is increased within one barrier pitch. FIG. 6 is a cross-sectional view illustrating a structure of a switchable barrier according to another aspect of the present disclosure.

A switchable barrier according to another aspect of the present disclosure includes a transparent lower substrate GL and a transparent upper substrate GU joined in surface each other, and a liquid crystal layer LC inserted between them. The lower substrate GL includes a plurality of lower electrodes EL. The upper substrate GU includes an upper electrode EU. The upper electrode EU may have a one sheet shape covering whole surface of the upper substrate GU, and be supplied with an electric base voltage.

The lower electrodes EL are arrayed with a predetermined distance. In detail, the lower electrodes EL are disposed in a triple layer structure. For example, on the lower substrate GL, a plurality of first lower electrodes EL1 is arrayed with a first predetermined distance. The first lower electrodes EL1 are covered by a first passivation layer PAS1. On the first passivation layer PAS1, a plurality of second lower electrode EL2 is arrayed with a second predetermined distance. The first lower electrodes EL1 and the second lower electrode EL2 are disposed as not overlapping each other with the first passivation layer PAS1 there-between.

The second lower electrodes EL2 are covered by a second passivation layer PAS2. On the second passivation layer PAS2, a plurality of third lower electrode EL3 is arrayed with a third predetermined distance. The second lower electrodes EL2 and the third lower electrode EL3 are disposed not to be vertically overlapping each other with the second passivation layer PAS2 there-between.

The first lower electrodes ELL the second lower electrodes EL2 and the third lower electrodes EL3 are disposed with a predetermined distance not to be vertically overlapping each other. For example, between two neighboring first lower electrodes ELL one of the second lower electrodes EL2 and one of the third lower electrodes EL3 are disposed. Further, between two neighboring second lower electrodes EL2, one of the first lower electrodes EL1 and one of the third lower electrodes EL3 are disposed. By the same way, between two neighboring third lower electrodes EL3, one of the first lower electrodes EL1 and one of the second lower electrodes EL2 are disposed.

In detail, the first lower electrodes EL1 may have a width of 4 µm and are disposed with a distance of 8 µm. The second lower electrodes EL2 may have a width of 4 µm and are disposed with a distance of 8 µm, on the first passivation layer PAS1 not vertically overlapping the first lower electrode ELL. The third lower electrodes EL3 may have a width of 4 µm and are disposed with a distance of 8 µm, on the second passivation layer PAS2 not vertically overlapping the first lower electrode EL1 and the second lower electrode EL2.

Each of the first lower electrode ELL the second lower electrode EL2 and the third lower electrode EL3 is supplied with an electric voltage, respectively. Then by the voltage differences between the lower electrodes EL and the upper electrode EU, the molecules of the liquid crystal layer LC may be rotated or changed their positions. As the conditions of the liquid crystal molecules are changed, the aperture area AP and the barrier area BR can be formed.

For example, as shown in FIG. 6, when 24 of lower electrodes EL are disposed within one barrier pitch, one channel CH is formed at every each lower electrode EL. That is, 24 of channels CH1 to CH24 are continuously disposed within one barrier pitch.

Under this structure, the electric voltage of 0V is applied to from the first channel CH1 to the sixth channel CH6, and from the nineteenth channel CH19 to the twenty-fourth channel CH24. Further, the electric voltage of 10V is applied to from the seventh channel CH7 to the eighteenth channel CH18, so that the aperture area AP and the barrier area BR are formed. That is, the area from the seventh channel CH7 to the eighteenth channel CH18 is defined as the aperture area AP of the switchable barrier SB.

For the second aspect, by supplying the different electric voltages to the first lower electrodes ELL the second lower electrodes EL2 and the third lower electrodes EL3, the electric voltages for driving the liquid crystal layer LC may be supplied at each channel, as shown in Table 2. In Table 2, the electric voltages are supplied to the lower electrodes EL. The upper electrode EU is supplied with a common electric voltage (e.g., 0V).

TABLE 2

| Channel (CH) | EL1 voltage (V) | EL2 voltage (V) | EL3 voltage (V) | Channel Voltage (V) |
|---|---|---|---|---|
| CH1 | — | — | 0 | 0 |
| CH2 | — | 0 | — | 0 |
| CH3 | 0 | — | — | 0 |
| CH4 | — | — | 0 | 0 |
| CH5 | — | 0 | — | 0 |
| CH6 | 0 | — | — | 0 |
| CH7 | — | — | 5 | 5 |
| CH8 | — | 10 | — | 10 |
| CH9 | 10 | — | — | 10 |
| CH10 | — | — | 10 | 10 |
| CH11 | — | 10 | — | 10 |
| CH12 | 10 | — | — | 10 |
| CH13 | — | — | 10 | 10 |
| CH14 | — | 10 | — | 10 |

TABLE 2-continued

| Channel (CH) | EL1 voltage (V) | EL2 voltage (V) | EL3 voltage (V) | Channel Voltage (V) |
|---|---|---|---|---|
| CH15 | 10 | — | — | 10 |
| CH16 | — | — | 10 | 10 |
| CH17 | — | 10 | — | 10 |
| CH18 | 5 | — | — | 5 |
| CH19 | — | — | 0 | 0 |
| CH20 | — | 0 | — | 0 |
| CH21 | 0 | — | — | 0 |
| CH22 | — | — | 0 | 0 |
| CH23 | — | 0 | — | 0 |
| CH24 | 0 | — | — | 0 |

In the Table 2, '-' means that there is no corresponding lower electrode. For example, the first channel CH1 has only the third lower electrode EL3. By applying 0V to the third lower electrode EL3 allocated at the first channel CH1, the channel voltage can be set to 0V. The reason that the channel voltage of 5V is applied to from the seventh channel CH7 to the eighteenth channel CH18 is for making the boundary between the aperture area AP and the barrier area BR be smooth. If required, all channel voltages can be set one of 0V or 10V. Here, the channels having the 0V can form the barrier area BR and the channels having the 10V can form the aperture area AP.

When it is required that the aperture area AP be moved to other location, the channels applied with 10V can be changed by controlling the voltages supplied to the lower electrodes ELL EL2 and EL3. Then, the aperture area AP can be moved to other position. That is, the aperture area AP shown in FIG. 6 can be shifted or moved to the left side or the right side.

In the second aspect of the present disclosure, the switchable barrier SB has 24 channels in one barrier pitch. The switchable barrier SB according to the second aspect of the present disclosure has a plurality of the lower electrodes EL arrayed with a predetermined distance in series. By changing the distribution of the channels defined by the lower electrode EL, the size of the barrier pitch can be readily controlled. For example, when the width of the lower electrode EL is 4 µm, one barrier pitch would be 4(µm)×24 (CH)=96 µm. For another example, as allocating 20 channels to one barrier pitch, one barrier pitch would be 80 µm. Like this manner, the switchable barrier SB may be controlled according to the pixel size and the gap of the pixels disposed at the display panel under the switchable barrier SB. Also, the aperture area AP may be freely changed.

Further, in the second aspect, the lower electrodes EL are disposed as distributed at each of the three layers. As the results, the lower electrodes EL disposed on one layer have enough distance for ensuring the insulation each other. For example, the first lower electrodes EL1 having width of 4 µm are apart from each other with 8 µm distance, not overlapping with the second lower electrode EL2 and the third lower electrode EL3. When forming the lower electrodes EL, they are not electrically shorted by any residuals or foreign materials.

Further, the lower electrodes EL disposed at the boundary of the aperture area AP and the barrier area BR can be disposed at the furthermost layers. For example, in the case that the sixth channel CH6 and the seventh channel CH7 are disposed at the boundary of the barrier area BR and the aperture area AP, the lower electrode of the sixth channel CH6 is allocated to the first lower electrode EL1 and the lower electrode of the seventh channel CH7 is allocated to the third lower electrode EL3. As the first passivation layer PAS1 and the second passivation layer PAS2 are disposed between two neighboring lower electrodes having different electric voltages each other, the high insulating property can be ensured there-between. As the insulating breakage between the electrodes forming the switchable barrier can be prevented, the normal stereoscopic image can be provided.

Third Aspect

Figure 7:
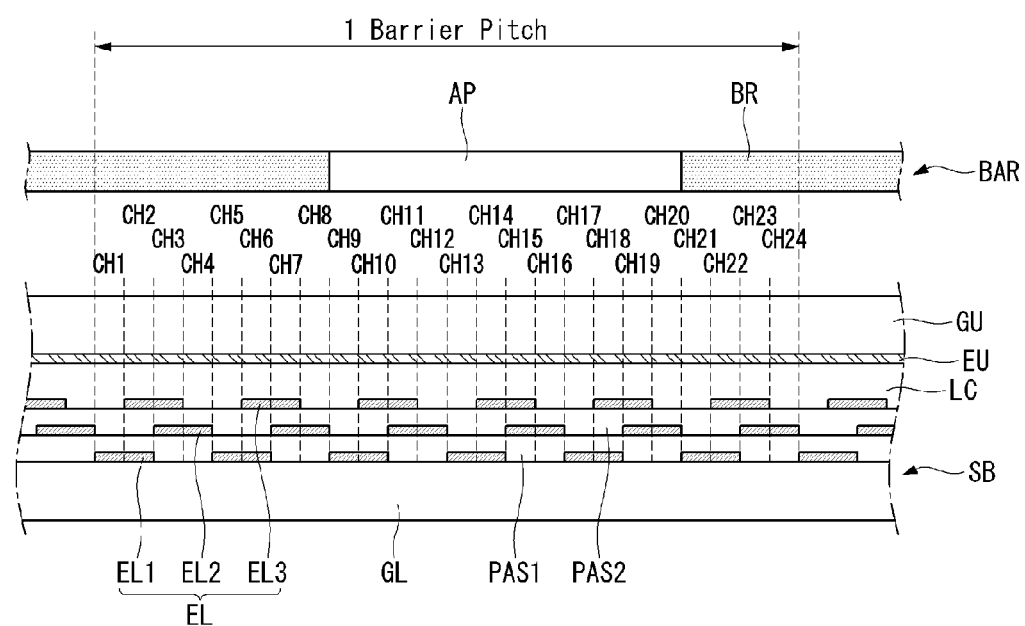
FIG. 7 is a cross-sectional view illustrating a structure of a switchable barrier according to yet another aspect of the present disclosure.

Yet another aspect of the present disclosure provides a switchable barrier having a structure in which more channels are allocated even though the width of the electrode is not too reduced. FIG. 7 is a cross-sectional view illustrating a structure of a switchable barrier according to yet another aspect of the present disclosure.

A switchable barrier according to yet another aspect of the present disclosure includes a transparent lower substrate GL and a transparent upper substrate GU joined in surface each other, and a liquid crystal layer LC inserted between them. The lower substrate GL includes a plurality of lower electrodes EL. The upper substrate GU includes an upper electrode EU. The upper electrode EU may have a one sheet shape covering whole surface of the upper substrate GU, and can be supplied with the same reference voltage.

The lower electrodes EL having the same widths are arrayed with a predetermined distance. For example, on the lower substrate GL, a plurality of first lower electrodes EL1 having a first width is arrayed with a first predetermined distance. The first lower electrodes EL1 are covered by a first passivation layer PAS1. On the first passivation layer PAS1, a plurality of second lower electrode EL2 having a second width is arrayed with a second predetermined distance. The first lower electrodes EL1 and the second lower electrode EL2 are disposed not to be overlapping each other with the first passivation layer PAS1 there-between.

The second lower electrodes EL2 are covered by a second passivation layer PAS2. On the second passivation layer PAS2, a plurality of third lower electrode EL3 having a third width is arrayed with a third predetermined distance. Specifically, the third lower electrode EL3 vertically overlaps a half of the first lower electrode EL1 as well as a half of the second lower electrode EL2.

In detail, the first lower electrodes EL1 may have 8 µm of width and be arrayed with 8 µm gap (or distance). The second lower electrodes EL2 may have 8 µm of width and be arrayed with 8 µm on the first passivation layer PAS1. The third lower electrode EL3 may have 8 µm of width and be arrayed with 8 µm on the second passivation layer PAS2. Especially, each of the third lower electrodes EL3 vertically overlaps the half (4 µm) of the neighboring first lower electrode EL1 and the half (4 µm) of the neighboring second lower electrode EL2.

As the results, as shown in FIG. 7, 24 channels are formed within one barrier pitch. Unlike the first and the second examples, in the third example, the channels include a first channel, a second channel, a third channel and a fourth channel. The first kind channel is formed by only a first lower electrode EL1. The second kind channel is formed by only a second lower electrode EL2. The third kind channel is formed to have a overlapping portion between a first lower electrode EL1 and a third lower electrode EL3. The fourth kind channel is formed to have a overlapping portion between a second lower electrode EL2 and a third lower electrode EL3.

For the third aspect, by supplying different electric voltages to the first lower electrodes ELL the second lower electrodes EL2 and the third lower electrodes EL3, the electric voltages for driving the liquid crystal layer LC can be supplied at each channel, as shown in Table 3. In Table 3, the electric voltages are supplied to the lower electrodes EL. The upper electrode EU is supplied with a common electric voltage (e.g., 0V).

TABLE 3

| Channel (CH) | EL1 voltage (V) | EL2 voltage (V) | EL3 voltage (V) | Channel Voltage (V) |
| --- | --- | --- | --- | --- |
| CH1 | 0 | — | — | 0 |
| CH2 | 0 | — | 0 | 0 |
| CH3 | — | 0 | 0 | 0 |
| CH4 | — | 0 | — | 0 |
| CH5 | 0 | — | — | 0 |
| CH6 | 0 | — | 0 | 0 |
| CH7 | — | 0 | 0 | 0 |
| CH8 | — | 0 | — | 0 |
| CH9 | 5 | — | — | 5 |
| CH10 | 5 | — | 5 | 10 |
| CH11 | — | 10 | 5 | 15 |
| CH12 | — | 10 | — | 10 |
| CH13 | 10 | — | — | 10 |
| CH14 | 10 | — | 5 | 15 |
| CH15 | — | 10 | 5 | 15 |
| CH16 | — | 10 | — | 10 |
| CH17 | 10 | — | — | 10 |
| CH18 | 10 | — | 5 | 15 |
| CH19 | — | 5 | 5 | 10 |
| CH20 | — | 5 | — | 5 |
| CH21 | 0 | — | — | 0 |
| CH22 | 0 | — | 0 | 0 |
| CH23 | — | 0 | 0 | 0 |
| CH24 | — | 0 | — | 0 |

In the Table 3, '-' means that there is no corresponding lower electrode. For example, the first channel CH1 has only the first lower electrode EL1. The second channel CH2 has the first lower electrode EL1 and the third lower electrode EL3. Any one of lower electrodes EL is disposed to cover two neighboring channels. One channel has only one lower electrode EL or two lower electrodes disposed on different layer and vertically overlapping each other. The voltage of one channel voltage is decided by the electric voltage applied to one lower electrode or by the electric voltages applied to two lower electrodes disposed on different layer and overlapped each other. The channel voltages of the ninth channel CH9 and the twentieth channel CH20 are decided to the 5V in order to make the border area between the aperture area AP and the barrier area BR smooth. The channels having 0V of the channel voltage can form the barrier area BR, and the channels having 10V of the channel voltage or more can form the aperture area AP.

In the third aspect, the lower electrodes disposed at two different layers among the three layers do not overlap each other, and the lower electrode disposed at the other layer overlapps the electrodes disposed on the two layers. Therefore, there are many cases for arraying the lower electrodes according to yet another aspect. FIG. 7 shows the case in which the first lower electrodes EL1 do not overlap the second lower electrodes EL2.

Figure 8A:
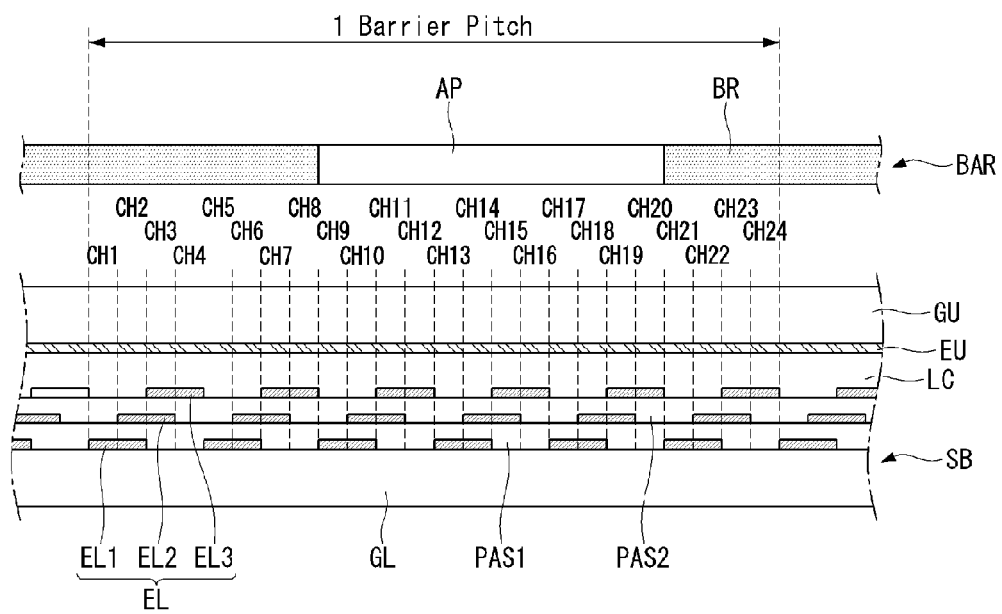
FIGS. 8A and 8B are cross-sectional views illustrating various switchable barriers having various electrode array structures, according to yet another aspect of the present disclosure.
Figure 8B:
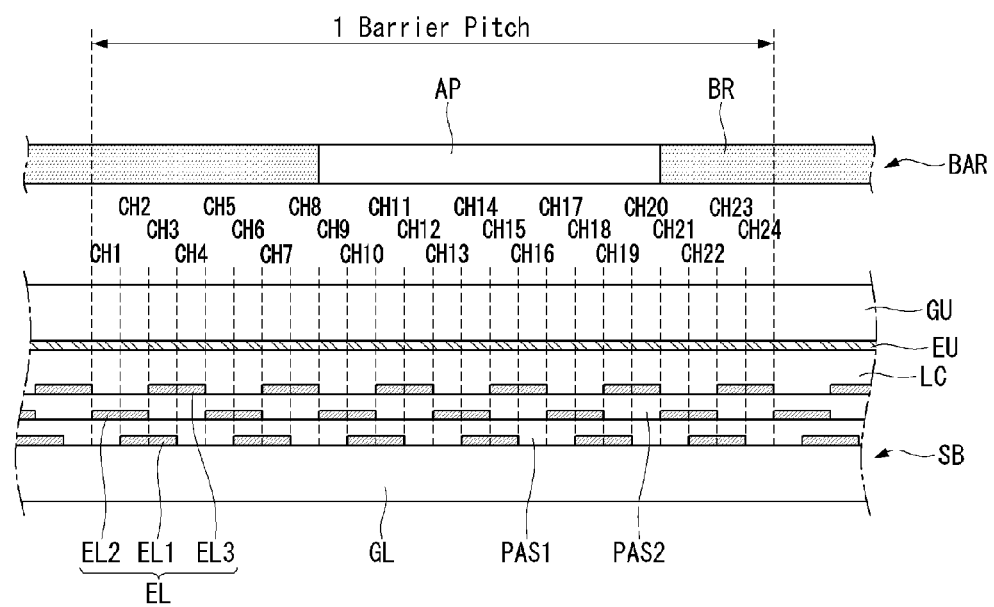

FIGS. 8A and 8B are cross-sectional views illustrating various switchable barriers having various electrode array structures, according to yet another aspect of the present disclosure. For a further aspect of the present disclosure, as shown in FIG. 8A, the first lower electrodes EL1 does not overlap the third lower electrodes EL3. For still another example, as shown in FIG. 8B, the second lower electrodes EL2 does not overlap the third lower electrodes EL3.

While the aspect of the present disclosure has been described in detail with reference to the drawings, it will be understood by those skilled in the art that the disclosure can be implemented in other specific forms without changing the technical spirit or essential features of the disclosure. Therefore, it should be noted that the forgoing aspects are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

What is claimed is:

1. An autostereoscopic 3D display comprising:
    a display panel including a plurality of pixels arrayed in a matrix form; and
    a switchable barrier disposed on a surface of the display panel facing a viewer, wherein the switchable barrier includes:
        a lower substrate having a plurality of first lower electrodes, a first passivation layer covering the first lower electrodes, a plurality of second lower electrodes on the first passivation layer, a second passivation layer covering the second lower electrodes, and a plurality of third lower electrodes on the second passivation layer;
        an upper substrate having an upper electrode facing the first lower electrodes, the second lower electrodes and the third lower electrodes; and
        a liquid crystal layer disposed between the lower substrate and the upper substrate,
    wherein the first lower electrodes have a width and each of the lower electrodes is spaced apart from each other with a distance of twice the width, and
    wherein the second lower electrodes have the width and are disposed with the distance, and each of the second lower electrodes is disposed between two of the first lower electrodes, and wherein the third lower electrodes have the width and are disposed with the distance, and each of the third lower electrodes is disposed between the first lower electrode and the second lower electrode.

2. The display according to claim 1, wherein the first lower electrodes, the second lower electrodes and the third lower electrodes define channels distinguishable from each other, and
    wherein an aperture area and a barrier area are defined by applying electric voltages to the channels.

3. The display according to claim 2, wherein the first and third lower electrodes are disposed from each other with a furthermost distance when the first and third lower electrodes' corresponding neighboring channels are disposed at a boundary between the aperture area and the barrier area.

4. An autostereoscopic 3D display comprising:
    a display panel including a plurality of pixels arrayed in a matrix form; and
    a switchable barrier disposed on a surface of the display panel facing a viewer, wherein the switchable barrier includes:
        a lower substrate having a plurality of first lower electrodes, a first passivation layer covering the first lower electrodes, a plurality of second lower electrodes on the first passivation layer, a second passivation layer covering the second lower electrodes, and a plurality of third lower electrodes on the second passivation layer;

an upper substrate having an upper electrode facing the first lower electrodes, the second lower electrodes and the third lower electrodes; and a liquid crystal layer disposed between the lower substrate and the upper substrate, wherein the first lower electrodes, the second lower electrodes and the third lower electrodes have a width and are disposed with a distance the same as the width, and wherein at least two of the first, second and third lower electrodes do not vertically overlap each other, and the other of the first, second and third lower electrodes overlap each half portion of the two of the first, second, and third lower electrodes overlapping each other.

5. The display according to claim 4, wherein each half portion of the two lower electrodes overlapping each other defines channels, and wherein an aperture area and a barrier area are defined by a final voltages of the channels decided by the combination of electric voltages supplied to the first, second and third lower electrodes, respectively.

6. The display according to claim 4, wherein each of the second lower electrodes is disposed between two neighboring first lower electrodes, and wherein each of the third lower electrodes overlaps a half portion of the first lower electrodes and a half portion of the second lower electrodes.

7. The display according to claim 4, wherein each of the third lower electrodes is disposed between two neighboring first lower electrodes, and wherein each of the second lower electrodes overlaps a half portion of the first lower electrodes and a half portion of the third lower electrodes.

8. The display according to claim 4, wherein each of the third lower electrodes is disposed between two neighboring second lower electrodes, and wherein each of the first lower electrodes overlap a half portion of the second lower electrodes and a half portion of the third lower electrodes.

9. An autostereoscopic 3D display device, comprising:
first and second substrates facing each other;
a plurality of first lower electrodes on the first substrate;
a first passivation layer on the first substrate including the plurality of first lower electrodes;
a plurality of second lower electrodes on the first passivation layer;
a second passivation layer on the first passivation layer including the second lower electrodes;
an upper electrode on the second substrate and facing the first and second substrates; and
a liquid crystal layer between the first and second substrates, wherein the first, second and third lower electrodes have a width and are disposed with a distance the same as the width, and at least two of the first, second and third lower electrodes do not vertically overlap each other, and the other of the first, second and third lower electrodes overlap each half portion of the two of the first, second, and third lower electrodes overlapping each other.

10. The display according to claim 9, wherein each half portion of the two lower electrodes overlapping each other defines channels, and an aperture area and a barrier area are defined by a final voltages of the channels decided by the combination of electric voltages supplied to the first, second and third lower electrodes, respectively.

11. The display according to claim 9, wherein each of the second lower electrodes is disposed between two neighboring first lower electrodes, and each of the third lower electrodes overlaps a half portion of the first lower electrodes and a half portion of the second lower electrodes.

12. The display according to claim 9, wherein each of the third lower electrodes is disposed between two neighboring first lower electrodes, and each of the second lower electrodes overlaps a half portion of the first lower electrodes and a half portion of the third lower electrodes.

13. The display according to claim 9, wherein each of the third lower electrodes is disposed between two neighboring second lower electrodes, and each of the first lower electrodes overlap a half portion of the second lower electrodes and a half portion of the third lower electrodes.

14. The display according to claim 9, wherein the first and third lower electrodes are disposed from each other with a furthermost distance when the first and third lower electrodes corresponding neighboring channels are disposed at a boundary between the aperture area and the barrier area.

* * * * *